(12) United States Patent
Povey

(10) Patent No.: US 9,494,950 B2
(45) Date of Patent: Nov. 15, 2016

(54) PRESSURE REGULATOR

(71) Applicant: Isis Innovation Limited, Oxford, Oxfordshire (GB)

(72) Inventor: Thomas Povey, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 105 days.

(21) Appl. No.: 14/356,492

(22) PCT Filed: Nov. 8, 2012

(86) PCT No.: PCT/GB2012/052774
§ 371 (c)(1),
(2) Date: May 6, 2014

(87) PCT Pub. No.: WO2013/068747
PCT Pub. Date: May 16, 2013

(65) Prior Publication Data
US 2015/0075649 A1   Mar. 19, 2015

(30) Foreign Application Priority Data

Nov. 8, 2011  (GB) .................................. 1119284.6

(51) Int. Cl.
*F16K 31/12*   (2006.01)
*G05D 16/18*   (2006.01)
*G05D 16/10*   (2006.01)

(52) U.S. Cl.
CPC ............ *G05D 16/18* (2013.01); *G05D 16/106* (2013.01); *Y10T 137/7793* (2015.04);
(Continued)

(58) Field of Classification Search
CPC .................... Y10T 137/7798; Y10T 137/7809; Y10T 137/7819; Y10T 137/7762; F16K 31/1223
(Continued)

(56) References Cited

U.S. PATENT DOCUMENTS 970,736 A * 9/1910 Neal et al. ...................... 251/28
1,743,055 A * 1/1930 Walker .................. F04B 49/035
251/28
(Continued)

FOREIGN PATENT DOCUMENTS

GB   2115756 A   9/1983

OTHER PUBLICATIONS

Search Report for United Kingdom Patent Application No. GB1119284.6 mailed Jan. 16, 2012, 3 pages.
(Continued)

*Primary Examiner* — Robert K Arundale
(74) *Attorney, Agent, or Firm* — Withrow & Terranova, P.L.L.C.; Vincent K. Gustafson

(57) ABSTRACT

A device (1; 101) for controlling the flow of a fluid through a conduit (2; 102; 402; 602; 702) from an upstream side (3; 103; 703) to a downstream side (5; 105; 405; 605; 705), the device (1; 101) comprising:
a valve having a valve member (14; 114; 414; 514; 614) arranged to move reciprocally selectively to open and close one or more valve apertures (10; 110; 412; 512; 611, 612), thereby controlling flow of the fluid from the upstream side (3; 103; 703) to the downstream side (5; 105; 405; 605; 705); and
means for introducing a reference pressure (24; 124; 324; 424; 524; 624);
wherein said valve member (14; 114; 414; 514; 614) is acted on by the pressure of the downstream side (5;
(Continued)

105; 405; 605; 705) and the reference pressure so as to be moved by the difference between said pressures.

21 Claims, 12 Drawing Sheets

(52) U.S. Cl.
 CPC ..... *Y10T 137/7797* (2015.04); *Y10T 137/7801* (2015.04); *Y10T 137/7819* (2015.04)

(58) Field of Classification Search
 USPC .......................................................... 251/28
 See application file for complete search history.

(56) References Cited

U.S. PATENT DOCUMENTS

| | | | |
|---|---|---|---|
| 3,734,120 A | | 5/1973 | Rowe et al. |
| 4,562,861 A | | 1/1986 | Payton |
| 4,811,756 A | | 3/1989 | Hall |
| 5,207,243 A | | 5/1993 | Sarro |
| 5,280,131 A | | 1/1994 | Sarro |
| 5,787,925 A | * | 8/1998 | Ollivier ................. G05D 16/14 137/489.5 |
| 6,006,780 A | | 12/1999 | Tseng et al. |
| 2009/0065719 A1 | * | 3/2009 | Stoever .............. G05D 16/2093 251/129.01 |
| 2010/0090136 A1 | | 4/2010 | Barriga Garcia et al. |

OTHER PUBLICATIONS

International Search Report for International Patent Application No. PCT/GB2012/052774 mailed Feb. 7, 2013, 2 pages.

\* cited by examiner

PRESSURE REGULATOR

This application is a national phase under 35 U.S.C. §371 of International Patent Application No. PCT/GB2012/052774, filed Nov. 8, 2012, the disclosure of which is incorporated herein by reference in its entirety.

This invention relates to apparatus for regulating pressure in fluid systems, in particular devices for controlling a flow rate in a fluid flow stream to deliver a desired output pressure.

In fluid flow systems such as pipes and conduits, e.g. as can be found in many different industrial situations, there is a need to regulate the pressure in a fluid flow stream. In such systems there is an input pressure that may be constant or fluctuating in time and which it is desired to control to a lower target output pressure, which also can be constant or fluctuating.

One example of such devices is a computer controlled pressure regulator in which the position of a valve is adjusted depending on the measured input and output pressures in order to deliver the desired output pressure. Such devices are very complicated, e.g. because of all the control circuitry and associated valve actuation needed to achieve the required sensitivity.

A second example of such devices is a pilot operated pressure regulator, which acts as a pressure regulator amplifier. The pilot regulator provides a reference pressure in a small plenum which in turn controls a larger regulator, as it is easier to control a small regulator. Such devices are generally rather large and protrude a long way from the pipe-work in which they are installed, as well as containing many different moving components, e.g. springs and valves, which require calibration and maintenance. Furthermore, these types of regulators can be relatively high cost, particularly those suitable for high mass flow rates.

It is an object of the invention to provide an improved pressure regulator.

When viewed from a first aspect the present invention provides a device for controlling the flow of a fluid through a conduit from an upstream side to a downstream side, the device comprising:

a valve having a valve member arranged to move reciprocally selectively to open and close one or more valve apertures, thereby controlling flow of the fluid from the upstream side to the downstream side; and means for introducing a reference pressure;

wherein said valve member is acted on by the pressure of the downstream side and the reference pressure so as to be moved by the difference between said pressures.

Thus it will be appreciated that by providing the simple arrangement of a reciprocally moving valve member to selectively open and close one or more valve apertures, with the valve member being acted on by the downstream pressure and the reference pressure, the downstream pressure can be controlled as desired, i.e. by setting the reference pressure. Thus in one set of embodiments the device comprises means to control the reference pressure. The valve member is simply moved by the difference in the downstream and reference pressures and thus controls the mass flow rate, through the aperture(s) in order to balance the downstream pressure with the reference pressure or bring it as close as is practicable to the reference pressure.

A further advantage of the device of the present invention is that it is very simple in operation, predominantly owing to having, in a preferred set of embodiments, only a single moving part that controls the flow through the valve aperture(s), i.e. the valve member. This simplicity is also reflected in the fact that in a preferred set of embodiments the device does not comprise any deformable parts, e.g. springs, extendable gaskets, diaphragms, etc, as are found in conventional pressure regulators. This all results in low maintenance costs, with no specialist tools being required to maintain the device.

In one set of embodiments, the movement of the valve member only depends on the difference in the downstream and reference pressures, and the valve member is not biased or acted on by any mechanical or deformable parts, e.g. a spring. In such embodiments the output pressure is regulated to a relatively stable value, by controlling the mass flow rate through the aperture(s), and can be controlled by the reference pressure such that a desired downstream output pressure is reached.

In one set of embodiments the valve member is moved towards a position in which the valve aperture(s) is/are open when the reference pressure is greater than the downstream pressure and moved towards a position in which the valve aperture(s) is/are closed when the reference pressure is less than the downstream pressure. For example, if the reference pressure is greater than the output pressure the valve member is moved towards a position which opens the aperture(s), therefore increasing the mass flow rate through the aperture(s) and consequently increasing the output pressure until the reference pressure is reached; if the output pressure is greater than the reference pressure the valve member is biased towards a position which closes the aperture(s), therefore decreasing the mass flow rate through the aperture(s) and consequently decreasing the output pressure until the reference pressure is reached. Therefore in one set of embodiments the device is arranged to deliver a constant output pressure for a varying input pressure, i.e. because the position of the valve member is only dependent on the difference between the reference and downstream pressures.

The valve member could be arranged to move reciprocally in any direction with respect to the conduit and its central axis. However in a preferred set of embodiments the valve member is arranged to move in a direction parallel to the axis of the conduit. It will be appreciated that this allows the device to be easily fitted within an existing pipe, e.g. inserted inside a pipe at a flange or even in a continuous section of pipe-work, as the largest dimension of the device is likely to be in that in which the valve member moves. Therefore no additional space is required to house the device and it can be retro-fitted rapidly and at low cost in most sections of pipe-work or at most pipe joints without any significant alteration in the pipe-work. As has been explained, conventional devices require the pipe-work layout to be redesigned for the new flow control equipment to be incorporated. Devices in accordance the present invention can therefore significantly reduce the cost and work required to incorporate it into an existing system.

The valve member could simply be arranged within the conduit to open and close the valve aperture(s), which could be arranged in the valve member itself, e.g. with the aperture(s) in the valve member moving either side of a wall within the conduit, or they could be arranged in another component, e.g. a wall or flange within the conduit. However, in a preferred set of embodiments, the device comprises a housing which comprises the valve aperture(s), i.e. the valve aperture(s) is/are provided in the housing, e.g. through a wall of the housing. In this set of embodiments, preferably the valve member is movably mounted with respect to the housing.

The device could comprise a single aperture, e.g. in the housing, through which the flow of fluid is controlled by the valve member. However in one set of embodiments the device comprises a plurality of apertures, e.g. in the housing, through which the flow of fluid is controlled by the valve member. Providing a plurality of apertures allows for greater control over the accuracy in which the flow of fluid is controlled through the device. For example, the apertures could be arranged such that the valve member closes a proportion of the apertures at a certain pressure, leaving the remaining apertures open, e.g. when the valve member is at an intermediate position in its distance of travel. This is achieved, in one set of embodiments by spacing the apertures in the direction parallel to the direction of reciprocal motion of the valve member, e.g. along the housing. It will be appreciated that the greater the number of apertures the device comprises, the finer the control over the proportion of the apertures that are open. Therefore in a preferred set of embodiments the device comprises at least 10 apertures through which the flow of fluid is controlled by the valve member, e.g. at least 20, e.g. at least 40, e.g. about 60 apertures. The plurality of apertures could also be spaced in the direction perpendicular to the direction of reciprocal motion of the valve member, e.g. around the housing.

In one set of embodiments the housing comprises an inlet and an outlet, e.g. with the inlet at the upstream end of the device and the outlet at the downstream end of the device. The housing could comprise a single aperture or a plurality of apertures which form(s) both the inlet and the outlet to the housing. In another set of embodiments the inlet and the outlet are separate from the aperture(s), i.e. the valve member controls the flow of fluid through the aperture(s) but not through the inlet and outlet. However, there is a set of embodiments envisaged in which the aperture(s) comprise(s) the inlet and/or the outlet, as well as the housing comprising one or more further apertures. For example, the inlet could comprise the aperture(s) controlled by the valve member with the outlet not being controlled by the valve member, or vice versa. Another example is that both the inlet and the outlet could be controlled by the valve member. In addition to these examples, the housing could comprise one or more further apertures also controlled by the valve member.

The aperture(s) could be provided by many different arrangements, e.g. conventional valve(s). In one set of embodiments the one or more apertures comprise one or more holes, e.g. in a wall of the housing. The holes could be any shape but are preferably circular. In the set of embodiments described above in which the apertures are spaced in the direction parallel to the direction of reciprocal motion of the valve member, this could be provided by the holes in the wall of the housing being spaced in this direction. The holes could all be the same size, so that the cumulative open area is approximately proportional to the displacement of the valve member; however in one set of embodiments the holes vary in size in a direction parallel to the direction of reciprocal motion of the valve member, e.g. along the housing. In one set of such embodiments the variation is a constant variation, e.g. a linear increase or decrease in radius or area of the holes. The holes may increase in size in the direction in which the valve member opens a greater number of holes. This arrangement gives the same accuracy of control of the fluid flow at both low and high mass flow rates. In other embodiments tapered slots could be used instead of discrete holes.

The inlet and/or the outlet, in the set of embodiments in which they do not comprise the aperture(s) that is/are controlled by the valve member, could comprise a similar aperture or plurality of apertures to the aperture(s) controlled by the valve member. For example they could comprise holes in a wall of the housing, though this may be a different wall to the one in which the aperture(s) is/are provided. Alternatively the inlet and/or the outlet could comprise an open end in the respective end of the housing.

In the set of embodiments in which an inlet and/or outlet is provided in addition to the aperture(s), preferably the inlet and/or outlet has a greater total cross-sectional flow area than the aperture(s) (when fully open). This enables the substantial majority of the flow restriction to be performed by the aperture(s), so that the pressure drop can be controlled in a predictable manner, without further restriction at the inlet and/or outlet which could detrimentally influence the determination of the pressure drop required. This condition is clearly satisfied if the inlet and/or outlet comprises an open end of the housing. In the set of embodiments in which the inlet and/or outlet, and the aperture(s), comprise holes, to provide a greater total cross-sectional area the aperture holes could be larger and/or there could be a greater number of them.

As discussed above, in preferred sets of embodiments the housing comprises a structure on which the valve member is movably mounted, and in which one or more apertures are provided. The housing could take many different forms to fulfil this purpose. In one set of embodiments the housing comprises one or more walls, e.g. side walls located in a direction parallel to the axis of the conduit, or end walls located in a direction perpendicular to this. Preferably the aperture(s) is/are formed in a wall of the housing. In one set of embodiments the aperture(s) is/are formed in an end wall, either at the upstream or downstream end of the housing, but preferably the aperture(s) is/are formed in a side wall of the housing. Providing the aperture(s) in a side wall of the housing allows the aperture(s) to be opened and closed easily by the reciprocal motion of the valve member in the direction parallel to the axis of the conduit, and also gives a number of benefits discussed above in relation to multiple apertures.

In one set of embodiments the housing comprises a cylinder, e.g. with its axis arranged parallel to the axis of the conduit in the set of embodiments in which the valve member moves. As will be appreciated, this allows the valve member to move along the length of the cylinder, opening and closing the aperture(s) as it moves. The cross-sectional shape could take any form, e.g. square, but in a preferred set of embodiments the cylinder comprises a circular cross-section. Preferably the valve member comprises the same cross-sectional shape as the cylinder, e.g. circular. In one set of embodiments the valve member is arranged to be mounted coaxially on the housing, e.g. with both the valve member and the housing comprising the same cross-sectional shape.

The arrangements mentioned above, in particular, as well as other embodiments, allow devices in accordance with the present invention to facilitate very high mass flows for a given conduit diameter and pressure compared to conventional pressure regulators. This is because of the simple layout of the device, particularly the housing, which gives a relatively straight flow path through the device and allows it, in certain configurations, to have a very low minimum pressure drop across the device, compared to the tortuous flow path and multiple moving components in a conventional pressure regulator. This creates a very flexible device which can be used for many different applications.

The housing, e.g. a cylinder structure, could be formed, at least in part, by the walls of the conduit in which the device is placed, e.g. simply by sectioning of a portion of the conduit with end caps or walls. However, in one set of embodiments the housing is provided as a separate structure within the conduit. Preferably the device also comprises a flange arranged for attaching the device to a conduit which could be mounted to the housing, e.g. a radially extending flange.

The housing could be formed from any suitable material which is suitable for the fluid pressure that will be experienced by the device. For example, in a low pressure system the housing could be formed from moulded plastic, whereas in a high pressure system the housing could be formed from aluminium or steel.

There are a number of different ways in which the device can be mounted within a conduit, e.g. using the aforementioned flange. As has been discussed, being able to mounted the device inside a conduit means that the device can easily be retro-fitted into an existing pipe-work layout. In a preferred set of embodiments, the device is mounted so that the valve member moves in a direction parallel to the axis of the conduit, i.e. the main direction of fluid flow within the conduit. In some embodiments, as discussed above, the cylindrical housing will also be mounted with its axis parallel to the conduit's axis. In a preferred set of embodiments the housing is mounted coaxially within the conduit. Also preferably, the valve member is arranged to move coaxially about the housing, e.g. within, straddling or outside the housing.

In one set of embodiments the device can be mounted between existing flanges or other connections, e.g. Victaulic (Registered Trade Mark) joints or other quick-connect couplings for high pressure pipe systems, in the pipe-work. This is particularly advantageous as it requires no major modifications of the existing pipe-work. At worst, there might be a very slight increase in the length of the pipe-work, e.g. to accommodate the flange of the device where one is provided. The flange of the device may only be approximately half of the thickness of the flange of the pipe, e.g. approximately a 15 mm increase in pipe length for an 8 inch (about 200 mm) diameter pipe. However in other arrangements a device in accordance with the invention may be mounted between existing flanges with no increase in length. Some minor modification may be necessary depending upon the design of the flanges.

In another set of embodiments the device can be mounted in a continuous section of pipe, i.e. without having to be mounted between flanges or an existing connection. In these embodiments the device can be mounted by welding it, or by means of any other attachment process, to the inner surface of a pipe. Also in these embodiments, the device can be fitted against a projection, e.g. an annular ring, fitted to the inner surface of the pipe. The annular ring can be welded to the inner surface of the pipe, or attached by other means, as is appropriate. Likewise, the device, e.g. by its flange, can be attached to the annular ring by any appropriate means of attachment, though, for example, the annular ring and the flange could be formed with complimentary means of attachment to enable them to be fixed together easily inside the pipe. As will be appreciated, none of these embodiments required the length of the pipe-work to be modified.

This brings a significant advantage and improvement over conventional devices in that embodiments of the present invention does not necessarily require its own certified pressure housing, i.e. because they can be designed to fit within an existing pipe-work layout. Therefore the cost of certification is low, making them more attractive to use than conventional devices. Furthermore, if certification is not necessary, devices in accordance with the present invention can be manufactured to slightly less stringent requirements, further lowering the cost.

In any of the embodiments discussed above with regard to the mounting of the device in an arrangement of pipe-work, the device could be fitted to a section of pipe which is then fitted into an existing pipe-work layout, e.g. by removal of a section of pipe and replacing it with the section of pipe with the device fitted inside. This is particularly useful in a complex pipe layout in which it may be difficult to fit the device in situ, but it is feasible to replace a particular section of pipe. The invention therefore extends to a section or sections of pipe comprising the device as recited in the first aspect of the invention.

A further advantage of providing the device so that it is contained within an existing or conventional section of pipe-work is that it removes the requirement for the device itself to have its own pressure housing which must be independently certified. Instead it is only necessary for the existing or standard pipe to have pressure certification which is much more straightforward. Depending on application the device may be produced with a high shut-off tightness (leak rate as a fraction of the regulator capacity at full travel) or to give complete shut-off. In some applications though a lower shut-off tightness might be tolerated (such that there is some leakage from upstream to downstream sides). If the device can be manufactured such that a high shut-off tightness is not required, it removes the need for additional or expensive seals to be incorporated in the device, further decreasing the cost of the device.

The valve member can be arranged in the device in any way in which it achieves its purpose of moving in a reciprocal manner to open and close the aperture(s). As has been described, preferably the valve member moves in a direction parallel to the axis of the conduit and preferably the valve member is movably mounted with respect to the housing. In one set of embodiments the valve member is mounted on the outside of the housing. In the set of embodiments in which the housing comprises a cylinder, the valve member could comprise a sheath on the outside of the housing. Such an arrangement facilitates the reciprocal motion of the valve member, particularly if the valve member has the same cross-sectional shape as the housing. The valve member could extend at least part of the way round the housing, but in a preferred set of embodiments the valve member extends all the way round the housing. This set of embodiments complements the set of embodiments in which a plurality of apertures are provided around the housing. Different arrangements for the sheath extending around the housing can be envisaged, but in a preferred set of embodiments the sheath is arranged coaxially around the housing.

In another set of embodiments the valve member is mounted on the inside of the housing. In the embodiments in which the housing comprises a cylinder, the valve member could also comprise a smaller cylinder within the housing, e.g. a piston. This arrangement also facilitates the reciprocal motion of the valve member, particularly if the valve member has the same cross-sectional shape as the housing. In the set of embodiments in which a plurality of apertures are provided around the housing the valve member could be shaped to control the flow of fluid through the apertures, e.g. by having a continuous surface around its perimeter.

Other arrangements are also envisaged, e.g. with part of the valve member being mounted on the outside of the housing and part of the valve member being mounted on the inside of the housing, e.g. so that the valve member at some point extends through a wall of the housing.

Even in the embodiments in which the valve member comprises a cylinder, this shape need not necessarily be for the whole of its length. For example, the valve member could comprise one shape, e.g. a cylinder, in the region of in which it controls the flow of fluid through the aperture(s), and a different shape, e.g. a disc or plate, in the region in which it is acted on by the reference pressure. The two different sections of the valve member could be shaped continuously from one to another, e.g. in an integral shape, or it could comprise two or more discrete parts, each adapted for its specific purpose as described. These could be joined by one or more intermediate members.

It is not critical in which direction the valve member is located with respect to the aperture(s), e.g. whether it moves upstream or downstream to close the aperture(s). Typically this will depend on the direction in which the reference pressure biases the valve member. For example, if the reference pressure biases the valve member in an upstream direction, the aperture(s) would be located downstream of the valve member, and vice versa.

The valve member could be formed from any suitable material or materials. A suitable material can be chosen depending on the way in which the valve member is mounted on the housing, e.g. as discussed above. In one set of embodiments the valve member comprises plastic, e.g. PTFE, which could be moulded or turned to create the required shape. Plastic generally has a low coefficient of friction when moving on a metal surface, making it a suitable choice if the housing or conduit is metal as the valve member needs to freely move about the housing or conduit if the device is to operate efficiently.

In the set of embodiments in which the valve member comprises two or more sections or parts, these could comprise the same material, or they could comprise different materials according to their requirements. For example the parts which come into contact with the housing, i.e. the part which closes the aperture(s) and, in some embodiments, the part which is acted on by the reference pressure, could comprise a low friction material, e.g. plastic, while the part joining these other parts could comprise a rigid, strong material, e.g. aluminium, which is not required to have any particular frictional properties.

In the set of embodiments in which the valve member comprises two or more sections or parts, e.g. one for being acted on by the reference pressure and one for controlling the fluid flow through the aperture(s), any part which does not need to maintain a pressure difference across it could be arranged to be pressure balanced. Therefore in one set of embodiments the part of the valve member which controls the fluid flow through the aperture(s) is arranged to be pressure balanced within the housing. This could be achieved, for example, by forming holes in this part of the valve member, so that any part of the valve member which is in a closed part of the housing or conduit is able to move freely without creating a vacuum or build-up of pressure.

In one set of embodiments the end or part of the valve member which is acted on by the reference pressure comprises a double-walled structure. Such a structure helps to prevent the reference pressure from being contaminated with fluid from the fluid flow in the conduit, and vice versa. Preferably the volume between each of the walls comprising the double-walled structure is vented, e.g. to atmosphere or into the downstream fluid flow, and/or the double-walled structure is arranged to allow some fluid to leak from the reference pressure. This venting or leakage is a small mass flow rate which helps to prevent the reference pressure being contaminated by the pressure on the other side of the valve member where the pressure is similar (but not identical to) the downstream pressure. In a set of embodiments, the reference pressure could be provided by a system which maintains a set pressure even when there is a small leak from higher pressure into the device e.g. by a regulated inflow and a suitable pressure relief system.

In one set of embodiments the device comprises damping means arranged to act on the valve member. This can help to reduce instability of the system which causes oscillation of the downstream pressure for a fixed regulator pressure. In use the damping means may be arranged to prevent or reduce rebound and/or oscillation of the valve member. The damping means could comprise dampers attached directly to the valve member, e.g. to act on the valve member whenever it is in motion, or the dampers could be attached to a housing where provided or other part of the device. The damping means could be mechanical, e.g. a spring, or could be gas or liquid filled. For example, damping means similar to a conventional gas filled damper could be provided simply by tuning the feed to the reference pressure. Damping may be required in certain operating regimes to reduce or remove instability and can be inexpensively incorporated into the device.

In one set of embodiments the reference pressure comprises a fluid pressure. The reference pressure could be provided by an external pressure device, e.g. a separate regulator, which delivers the reference pressure directly so as to act on the valve member. However in one set of embodiments the device comprises a plenum chamber subject to the reference pressure, e.g. controlled by the reference pressure control means. The reference pressure in the plenum chamber could also be provided by an external pressure device. As with the arrangement of the housing and the valve member, there are a number of possible arrangements for how the plenum chamber could be provided. For example in one set of embodiments the plenum chamber is formed within the housing, e.g. defined by one or more walls of the housing along with the part or end of the valve member upon which it is acting. In another set of embodiments the plenum chamber is formed between the housing and a wall of the conduit, along with the part or end of the valve member upon which it is acting, e.g. external to the housing.

In one set of embodiments the reference pressure, which in some embodiments is provided by the plenum chamber, is set by a pilot pressure regulator, e.g. a conventional regulating device, i.e. the reference pressure is controlled by the reference pressure control means. The reference pressure control means, e.g. the pilot pressure regulator, can be provided externally or internally to the conduit in which the device is placed. Providing reference pressure control means, e.g. the pilot pressure regulator, internally allows the whole device to be housed within a conduit with no external protrusions, which will be appreciated to be of great advantage in a complex pipe-work system in which space is at a premium, and allows the device to be easily retrofitted into an existing system, e.g. within existing pipe-work or at a flanged interface. The pressure set by the reference pressure control means, e.g. the pilot pressure regulator, can be derived from an external secondary source, e.g. an air supply which is controlled using a valve, tap, knob, etc, or even remotely, or the pressure can be regulated directly from the input pressure upstream from the device.

The former alternative (using a secondary source to determine the pressure set by the reference pressure control means, e.g. a pressure regulator) is useful when a predetermined value for the downstream pressure is required, i.e. the secondary source can be set to deliver the desired pressure to the reference pressure. The latter alternative (determining the pressure set by reference to the upstream pressure) is useful when the downstream pressure is required to vary in accordance with variations in the upstream pressure, e.g. to set a predetermined pressure drop or predetermined ratio between the upstream and downstream pressures. For example, if the input pressure varies between 20 bar and 40 bar, and the pressure control means, e.g. the pilot pressure regulator, is arranged to deliver a reference pressure which is half of the upstream pressure, in order to enable the device to control the downstream pressure to be half of the upstream pressure, if the upstream pressure is 20 bar, the reference pressure is set at 10 bar, and if the upstream pressure is 40 bar, the reference pressure is set at 20 bar.

Devices in accordance with the present invention are suitable for almost any mass flow rate and pressure from very low to very high, e.g. from the order of Pa to MPa. This large range of pressures can be accommodated because the control of the device simply depends on the reference-downstream pressure differential which acts on the valve member. This control also enables embodiments of the device to adjust the mass flow rate or the pressure drop by a large range, i.e. the ratio of the maximum to the minimum pressure ratio across the device is very large. Therefore the device is suitable for many different uses and applications. With conventional devices it was not previously possible to deliver high mass flow rates through a pressure regulator without computer control, but embodiments of the invention enable this. Similarly, devices in accordance with the invention are scaleable to any size, e.g. for fitting into pipe diameters of a few millimeters to ones of several meters.

As will be appreciated devices in accordance with the present invention are suitable for many different applications when pressure regulation of a fluid flow is needed including, but not limited to, clean or shop air in industrial applications, process fluids in an industrial plant, transmission pipelines to transport fluids such as water, oil and gas, mixtures of transport fluids, e.g. partially mixed oil and water mixtures, plant heating system applications, etc.

Certain preferred embodiments of the invention will now be described, by way of example only, with reference to the accompanying drawings in which.

Figure 8A:
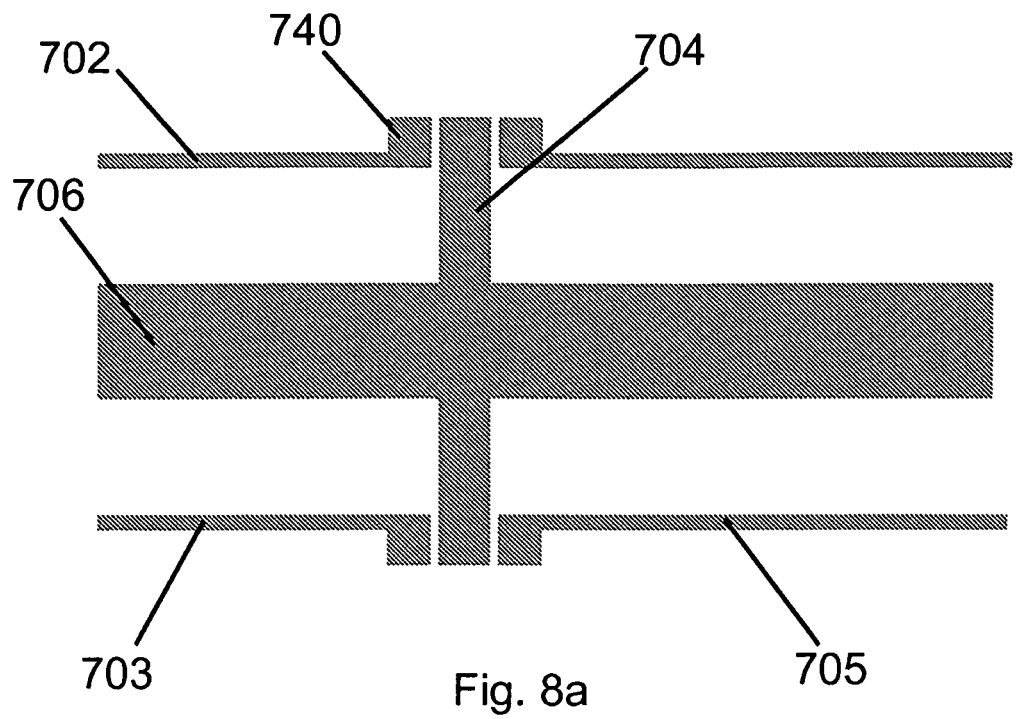
Figure 8B:
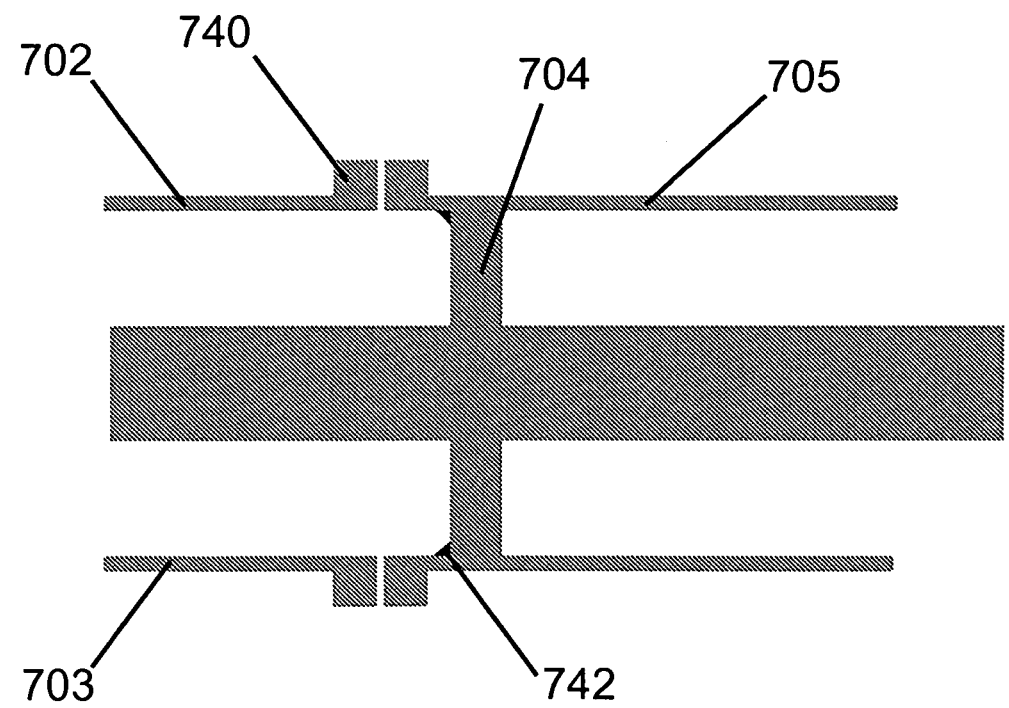
Figure 8C:
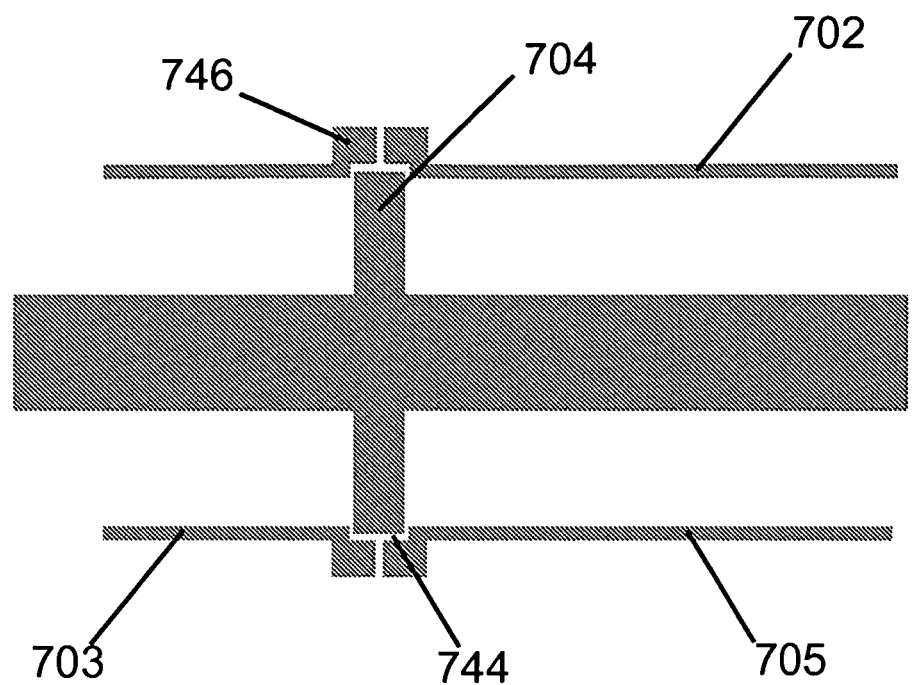
Figure 8D:
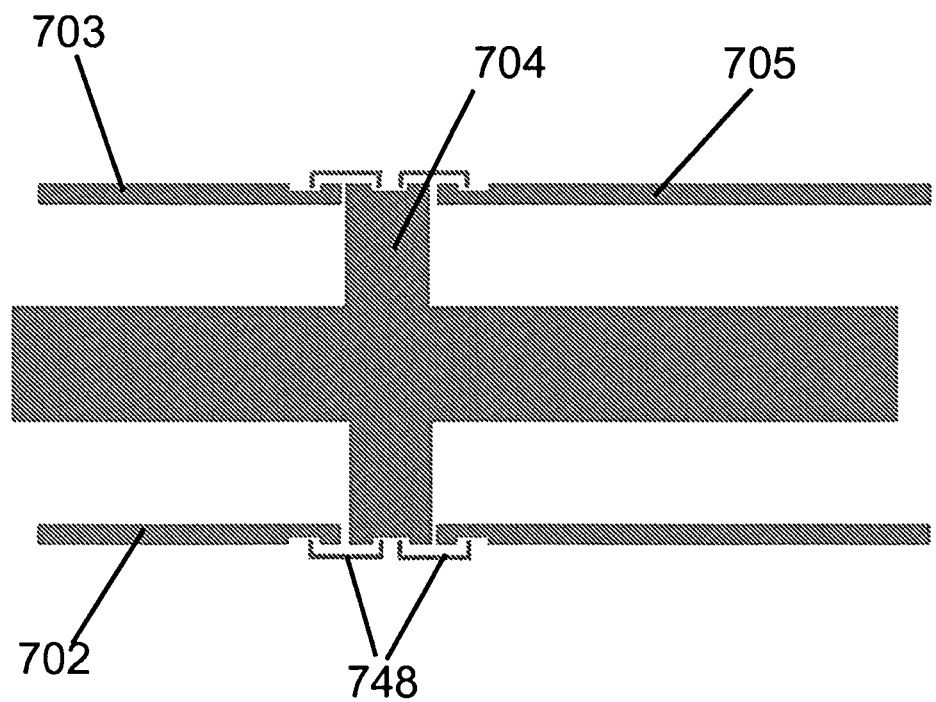
Figure 9A:
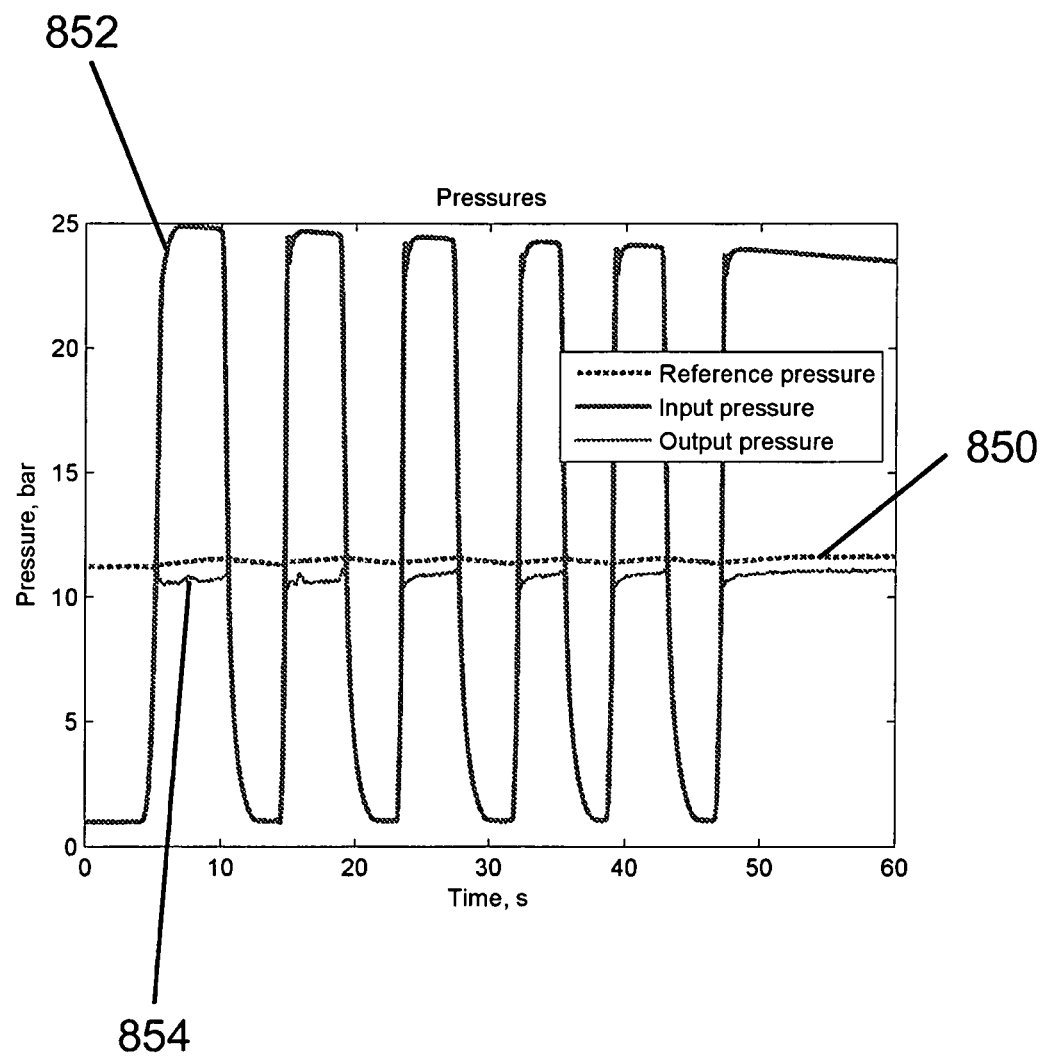
Figure 9B:
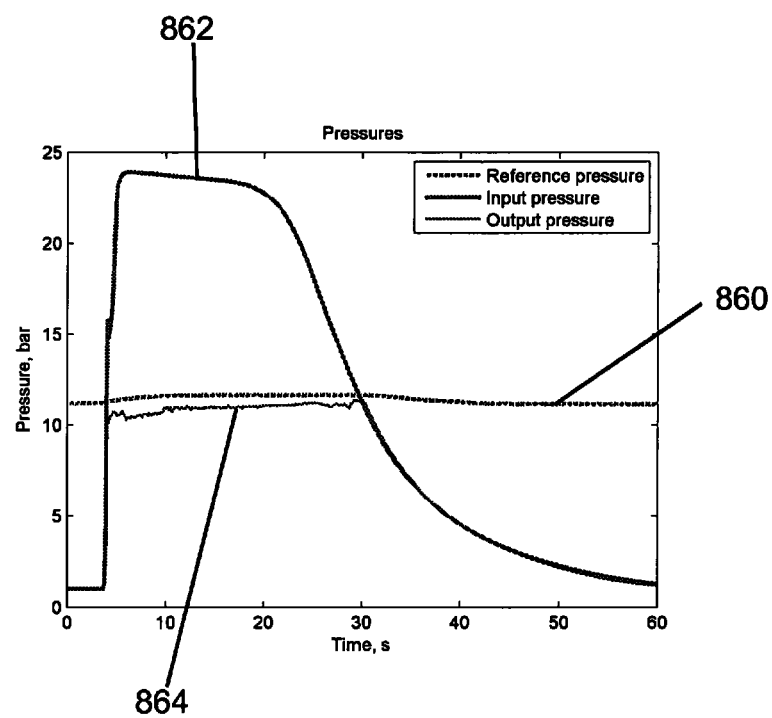
Figure 9C:
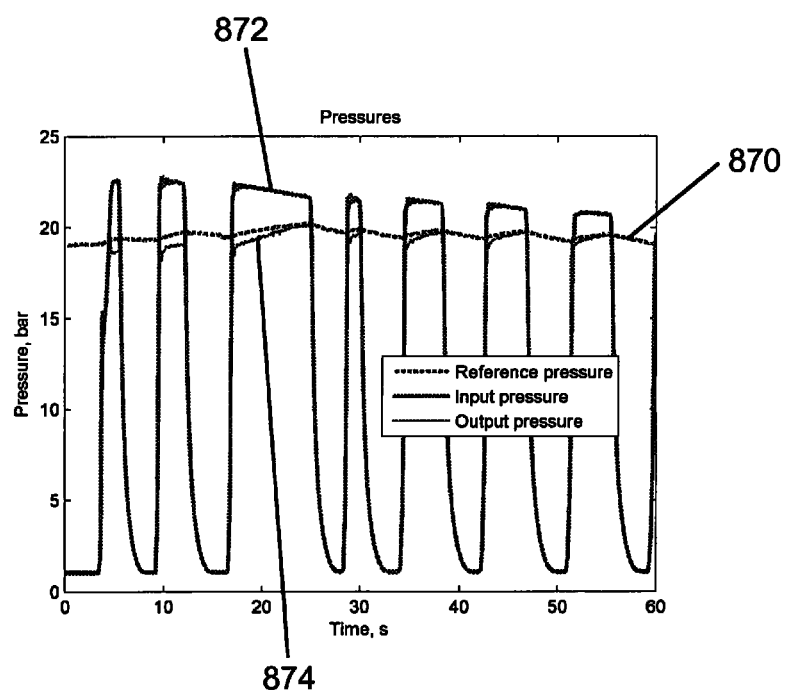

FIGS. 4a and 4b, 5a and 5b, 6a and 6b, and 7a and 7b show further schematic cross-sections of devices in accordance with the invention;

FIGS. 8a, 8b, 8c and 8d show schematic cross-sections of examples of how embodiments of the invention can be attached to a pipe; and FIGS. 9a, 9b and 9c show plots of experimental results obtained using an embodiment of the invention.

Figure 1A:
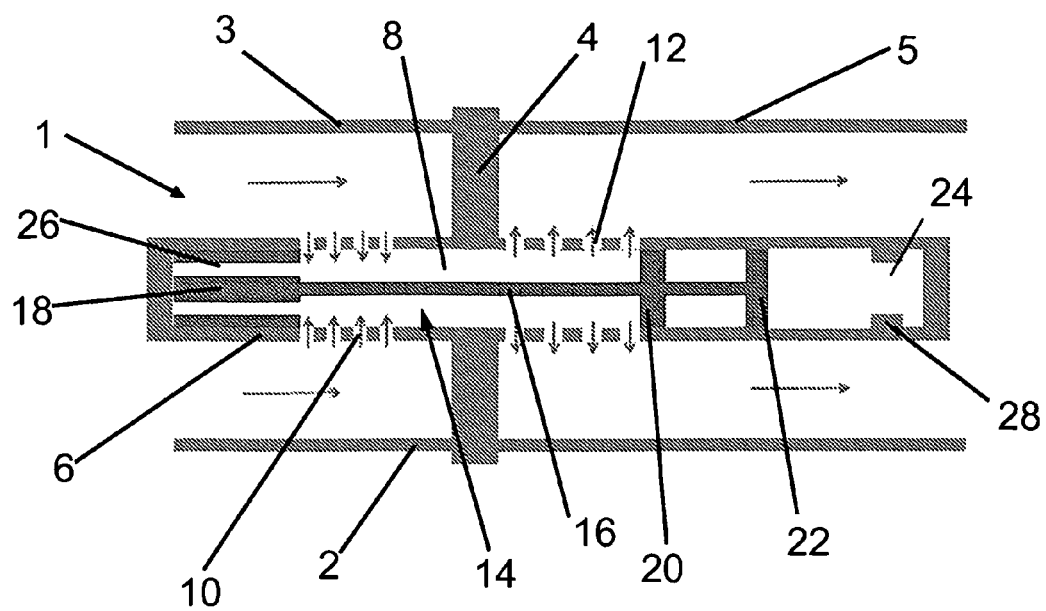
FIGS. 1a and 1b show a schematic cross-section of a device in accordance with the invention.
Figure 1B:
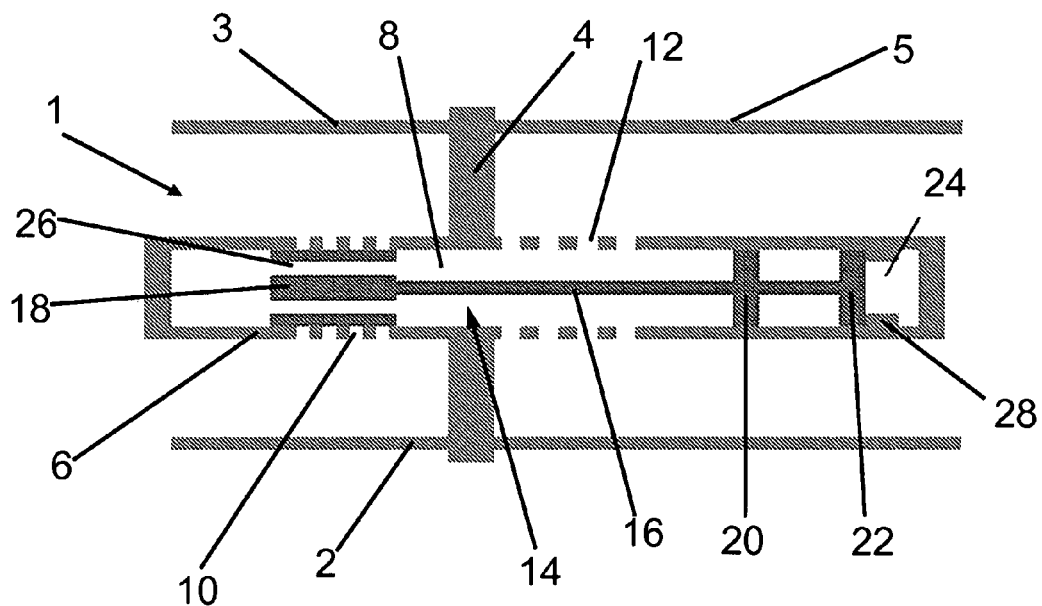

FIGS. 1a and 1b show cross-sectional views of a schematic of a device 1 in accordance with the invention. The device 1 is mounted in a conduit comprising a cylindrical pipe 2 by means of a flange 4. The fluid flow in the pipe 2 is from left to right, with the device 1 dividing the pipe 2 into an upstream section 3 and a downstream section 5. Various options of how the flange 4 can be mounted to the pipe 2 are shown in and discussed with respect to FIGS. 8a, 8b, 8c and 8d.

The device comprises a cylindrical housing 6 which is mounted through and attached to the flange 4 to secure the housing 6 in a fixed position with respect to the pipe 2. The housing 6 defines a cylindrical chamber 8 and comprises a set of inlet apertures 10 that provide fluid communication between the upstream section 3 of the pipe 2 and the chamber 8. The housing 6 also comprises a set of outlet apertures 12 that provide fluid communication between the downstream section 5 of the pipe 2 and the chamber 8. In general the outlet apertures 12 are larger than the inlet apertures 10. The inlet apertures 10 and/or the outlet apertures 12 may be located all the way round the perimeter of the housing.

Within the chamber 8 of the housing 6 is housed a valve member 14. The valve member 14 comprises a shaft 16 which connects a cylindrical piston 18 at the upstream end and two plugs 20,22 at the downstream end. The plug 22 at the distal downstream end of the valve member defines a plenum chamber 24 within the downstream end of the chamber 8, and the plugs 20, 22 act to seal the plenum chamber 24 from the remaining volume of the chamber 8, i.e. from the fluid flowing through the pipe 2 and the housing 6. However, the seal might not be completely impermeable and may be designed to leak slightly as will be explained below. The piston 18 fills the inner perimeter of the chamber 8, and has a set of bores 26 running through it in a longitudinal direction in order to pressure balance the piston 18 within the chamber 8. A reference pressure is delivered to the plenum chamber 24 by a pressure regulator (not shown). The regulator can either be configured to set the reference pressure at a fixed value or at a value dependent on the pressure in the upstream section 3 of the pipe 2.

The valve member 14 is freely moveable reciprocally along the axis of the chamber 8 between the positions shown in FIGS. 1a and 1b. In FIG. 1a the valve member 14 is prevented from travelling any further downstream by the piston 18 coming into contact with the downstream end of the housing 6. In this position the piston 18 is completely clear of all of the inlet apertures 10 which are therefore all open, and the plenum chamber 24 is at its maximum volume. In FIG. 1b the valve member 14 is stopped from travelling any further upstream by the distal plug 22 contacting an inwardly projecting flange 28 which is offset from the downstream end of the housing 6. This acts to preserve a minimum volume of the plenum chamber 24 when the valve member 14 is in the position shown in FIG. 1b. In this position the piston 18 completely covers all the inlet apertures 10 which are therefore all closed and fluid is prevented from flowing through the device.

Operation of the device 1 will now be described with reference to FIGS. 1a and 1b. With no flow of fluid through the pipe 2 or the device 1, i.e. a low upstream and downstream pressure in the pipe 2, the reference pressure in the plenum chamber 24 acts on the distal plug 22 to bias the valve member 14 into the position shown in FIG. 1a with the piston 18 clear of the inlet apertures 10. If fluid flow commences in the pipe 1, the fluid will flow from the upstream section 3 of the pipe 2 through the inlet apertures 10 into the chamber 8 of the housing 6, through the chamber 8 and out of the outlet apertures 12 into the downstream section 5 of the pipe 2, as shown by the arrows in FIG. 1a.

As long as the pressure in the downstream section 5 of the pipe 2, which is roughly equivalent to the pressure inside the chamber 8 (because the outlet apertures 12 are large creating if any only a very small pressure drop across them), is less than the reference pressure in the plenum chamber 24, the valve member 14 will remain in the position shown in FIG. 1a and fluid will continue to flow impeded through the device 1.

If the pressure in the downstream section 5 of the pipe 2 increases above the reference pressure, the valve member 14 will be forced to move towards the downstream end of the chamber 8 thus reducing the plenum chamber 24 volume. The downstream pressure might increase as a result of an obstruction or blockage in the downstream section 5 of the pipe 2, because of a change in demand or because of an increase in pressure in the upstream section 3 of the pipe 2 which causes an increase in the mass flow rate through the device 1 and therefore in the downstream section 5 of the pipe 2.

The effect of this is two-fold. First, the regulator which controls the reference pressure in the plenum chamber 24 acts to reset the reference pressure, either to its set value or to a value dependent on the upstream pressure. Second, the movement downstream of the valve member 14 means that the piston 18 will cover at least some of the inlet apertures 10. Closing at least some of the inlet apertures 10 means that the mass flow rate into the chamber 8 will be reduced resulting in a reduction in the downstream pressure. As will be appreciated, the greater the pressure difference between the downstream pressure and the reference pressure, the further the valve member will be forced downstream within the chamber 8 therefore closing more of the inlet apertures 10 and reducing the mass flow rate into the chamber 8 to a greater extent, with the extreme being the situation shown in FIG. 1b in which the valve member 14 is in its furthest possible downstream position and therefore closing all the inlet apertures 10. As the downstream pressure reduces, as a result of the decrease in the mass flow rate through the device, to the same pressure as the reference pressure, the valve member will be biased back towards the upstream end of the chamber 8 thus re-opening the inlet apertures 10. Thus it will be appreciated that in this way the device acts to regulate the pressure in the downstream section 5 of the pipe 2, owing to the fact that the valve member 14 moves under pressure difference until it settles to a position where it is pressure balanced.

Figure 2A:
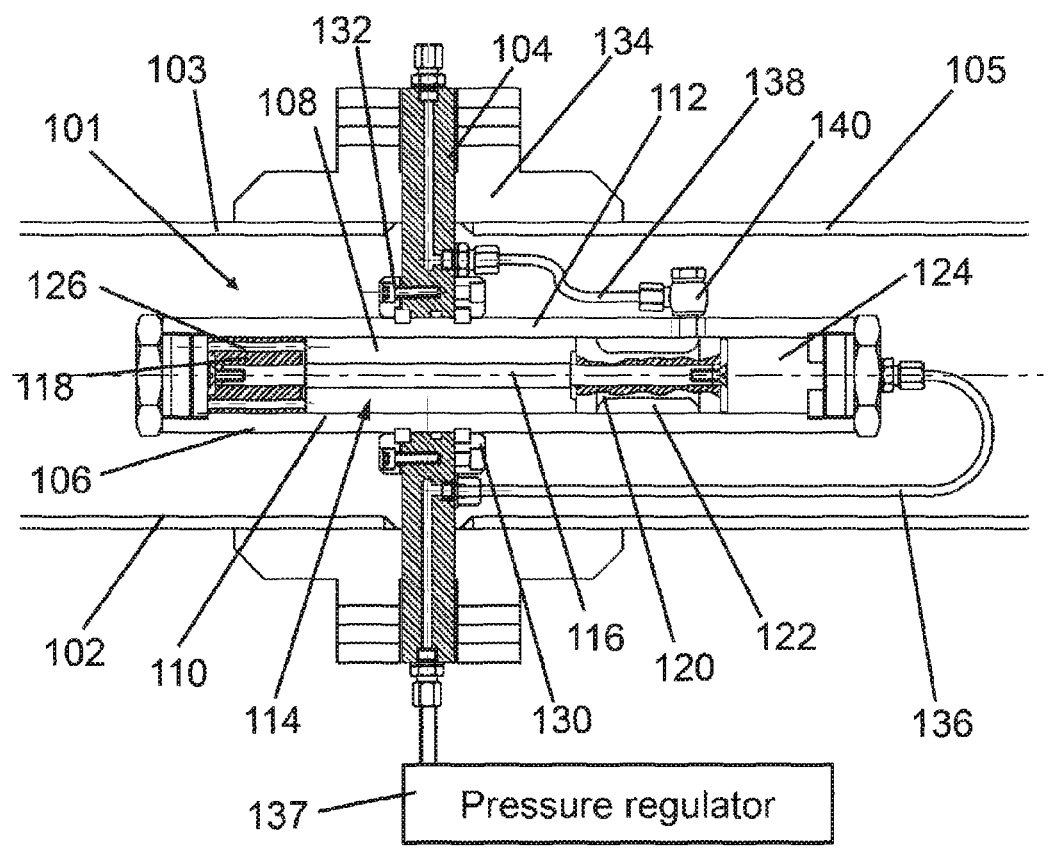
FIGS. 2a and 2b show a cross-section and an unrolled surface housing of a device corresponding to the schematic representation of FIGS. 1a and 1b.

FIG. 2a shows a cross-sectional view of a device 101 corresponding to the schematic representation shown in FIGS. 1a and 1b. As in FIGS. 1a and 1b, the device 101 is mounted in a cylindrical pipe 102 by means of a flange 104, and comprises a cylindrical steel housing 106 defining a chamber 108 with a set of inlet apertures 110 and outlet apertures 112. The chamber 108 houses a valve member 114 which comprises a shaft 116 that connects a cylindrical PTFE piston 118, which has a set of longitudinal bores 126 running through it, and a PTFE shuttle 120. The shuttle 120 is shaped to provide two longitudinally-spaced annular seals that define a cavity 122 between them. The shuttle 120 defines one end of a plenum chamber 124.

The housing 106 is mounted to the flange 104 by means of a smaller flange 130 that runs around the perimeter of the housing 106 and is attached by means of bolts 132. The device 101 is mounted to the pipe 102 by the flange 104 at a join between an upstream section 103 and a downstream section 105 of the pipe 102 by means of a standard flange 134 which is welded to the pipe 102.

Also shown in FIG. 2a is a narrow pipe 136 which connects the reference pressure plenum chamber 124 to the outside of the pipe 102 via the lower side of the flange 104. This allows a pressure regulator 137 to be attached to the end of the narrow pipe 136 at the flange 104 and thereby control the reference pressure in the plenum chamber 124. A further narrow pipe 138 runs from an attachment 140 in the wall of the housing 106 in communication with the shuttle cavity 122 to the upper side of the flange 104. This allows the cavity 122 to be vented in the event of any leak from either side of the shuttle 120, i.e. the chamber 108 or the plenum chamber 124, thus preventing pressure contamination.

Figure 2B:
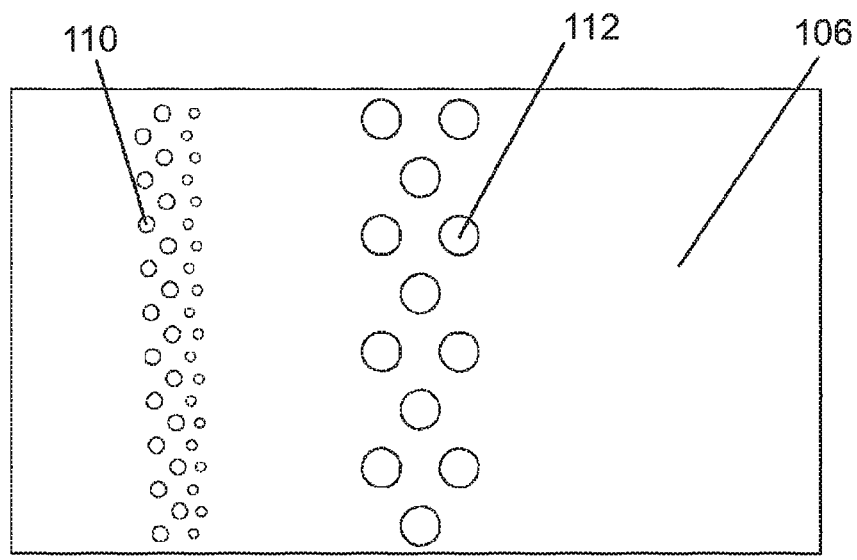

FIG. 2b shows an unrolled view of the housing 108 to show the arrangement of the inlet apertures 110 and the outlet apertures 112. The apertures 110,112 occupy the same position on the housing relative to the components of the valve member as shown in FIGS. 1a and 1b. The inlet apertures 110 decrease in size in the downstream direction so that the accuracy of control over the fluid flow is the same at both low and high mass flow rates. The outlet apertures 112 are much larger than the inlet apertures 110 so that they have little influence over the pressure drop through the device, i.e. it is all controlled by the inlet apertures 110.

The operation of the device shown in FIGS. 2a and 2b is as has already been described with reference to FIGS. 1a and 1b.

Figure 3:
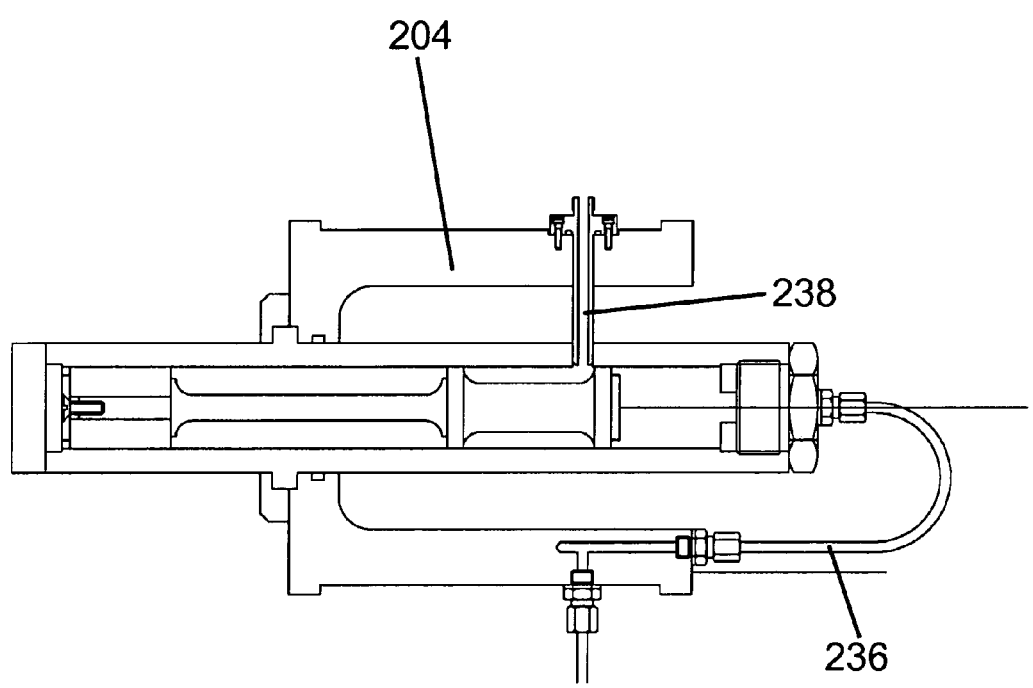
FIG. 3 shows a cross-section of an alternative device corresponding to the schematic representation of FIGS. 1a and 1b.

The device shown in FIG. 3 is very similar to those shown in FIGS. 1a, 1b, 2a and 2b, and operates in virtually the same way. The only difference is that the shape of the flange 204 is U-shaped rather than flat, which means that the narrow pipes 236, 238 can be shortened in length.

Figure 4A:
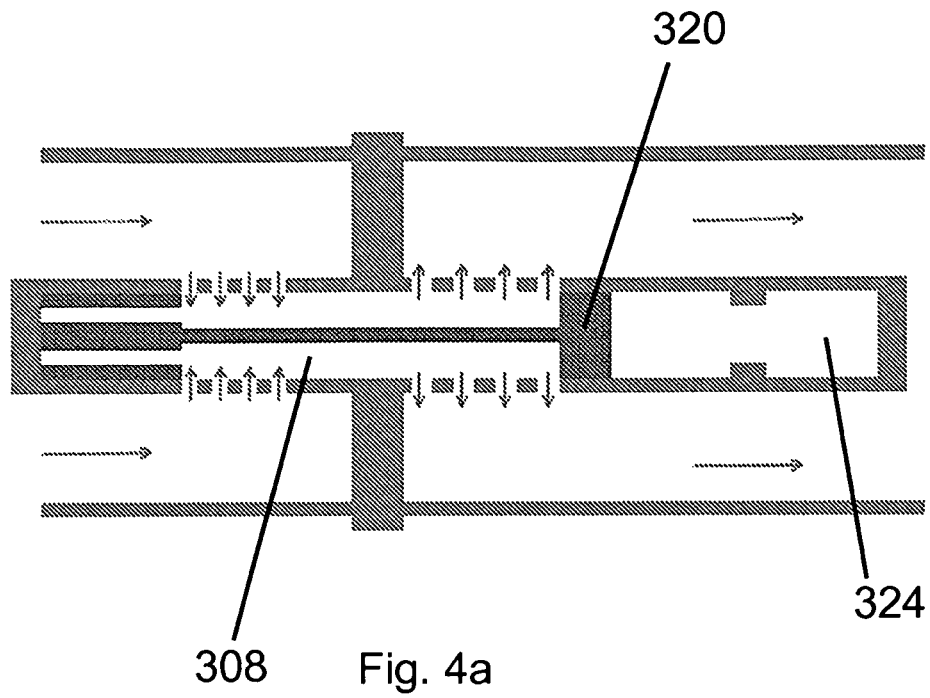
Figure 4B:
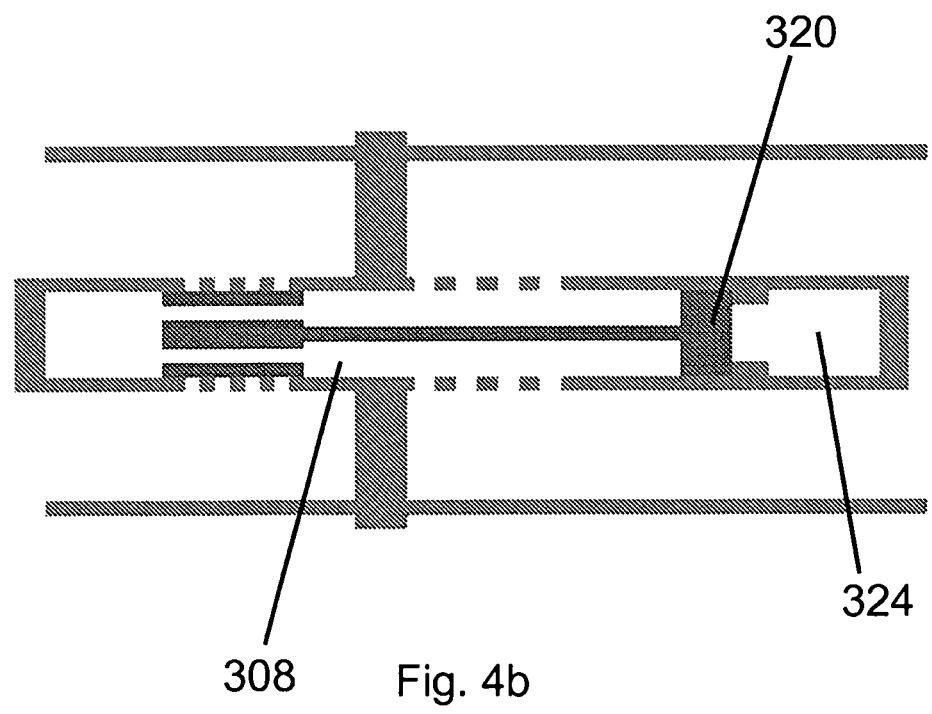

The schematic cross-sectional view of the device shown in FIGS. 4a and 4b is very similar to the devices shown in the previous Figures and operates in virtually the same way. The only difference is that the valve member comprises a single plug 320 which separates the plenum chamber 324 from the rest of the chamber 308.

Figure 5A:
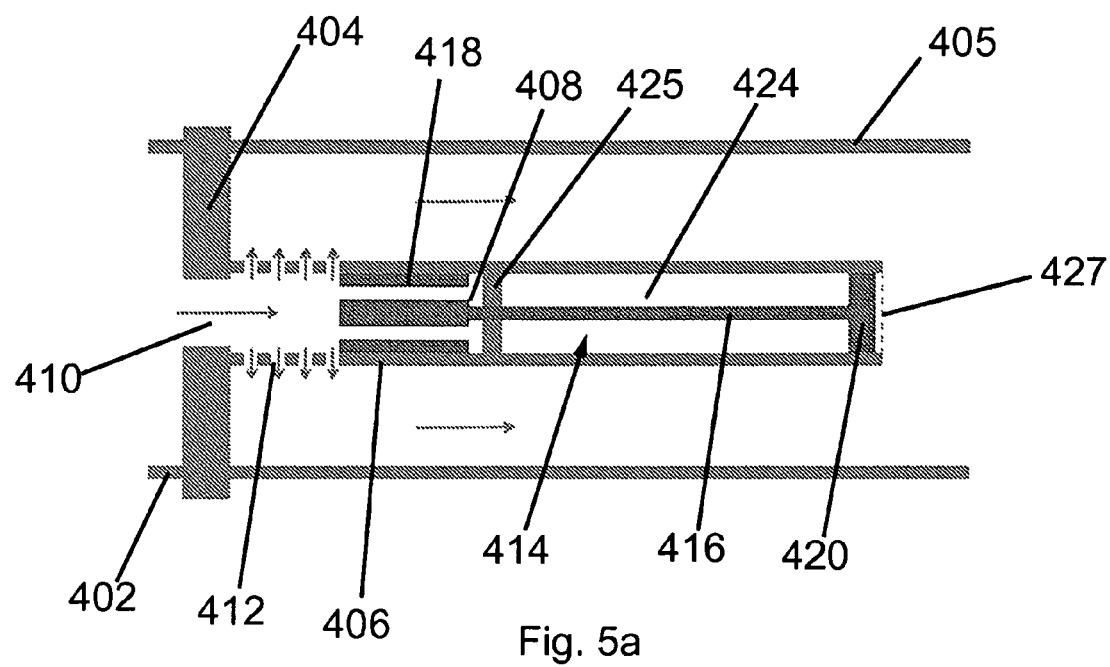
Figure 5B:
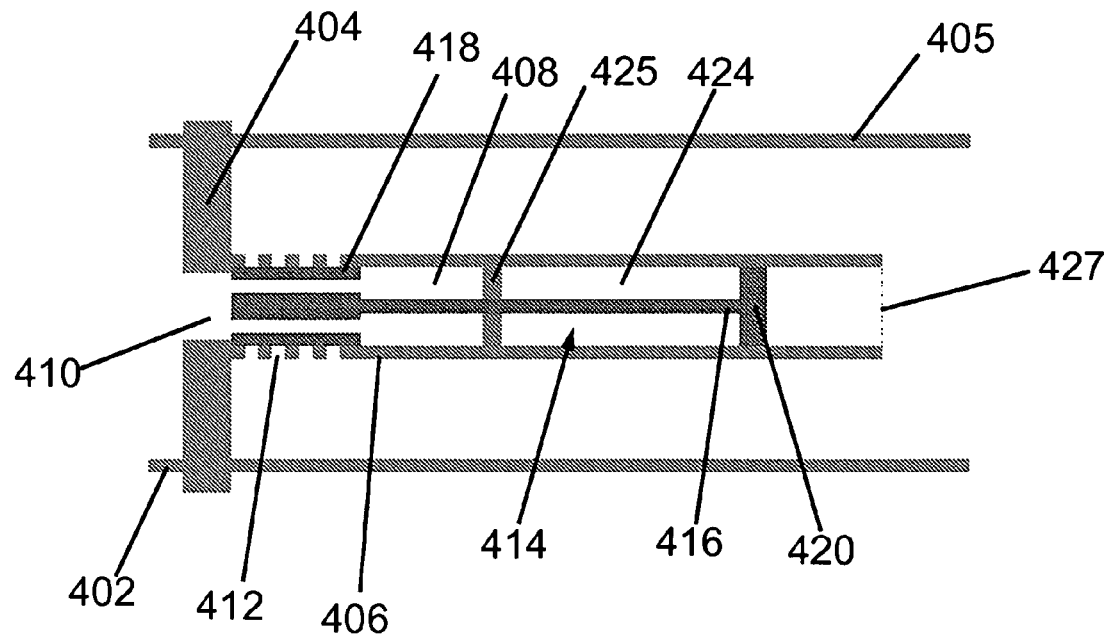

The schematic cross-sectional view of the device shown in FIGS. 5a and 5b shows a different arrangement of the housing 406. In this embodiment the housing 406 is mounted wholly downstream of the flange 404. There is a single inlet aperture 410 defined by an opening in the flange 404 and in the downstream end of the housing 406. The valve member 414 has the same features as shown in FIGS. 4a and 4b, i.e. with a single plug 420, but the plenum chamber 424 is arranged on the upstream side of the plug 420, so that the valve member 414 is moved into a downstream position if the reference pressure is greater than the downstream pressure. The other side of the plenum chamber is defined by a wall 425 through the middle of the chamber 408, with the shaft 416 of the valve member 414 passing through the wall 425.

At the downstream end of the housing 406, a screen 427 prevents any debris obstructing the movement of valve member 414, but allows the pressure to be balanced between the downstream section 405 of the pipe 402 and the portion of the chamber 408 between the plug 420 and the screen 427.

The device shown in FIGS. 5a and 5b operates in a similar way to the devices shown in the previous Figures, i.e. a pressure differential between the downstream pressure and the reference pressure acts to move the valve member 414. However in this embodiment the piston 418 of the valve member 414 moves to cover the outlet apertures 412 rather than the inlet apertures as in the previous embodiments.

Figure 6A:
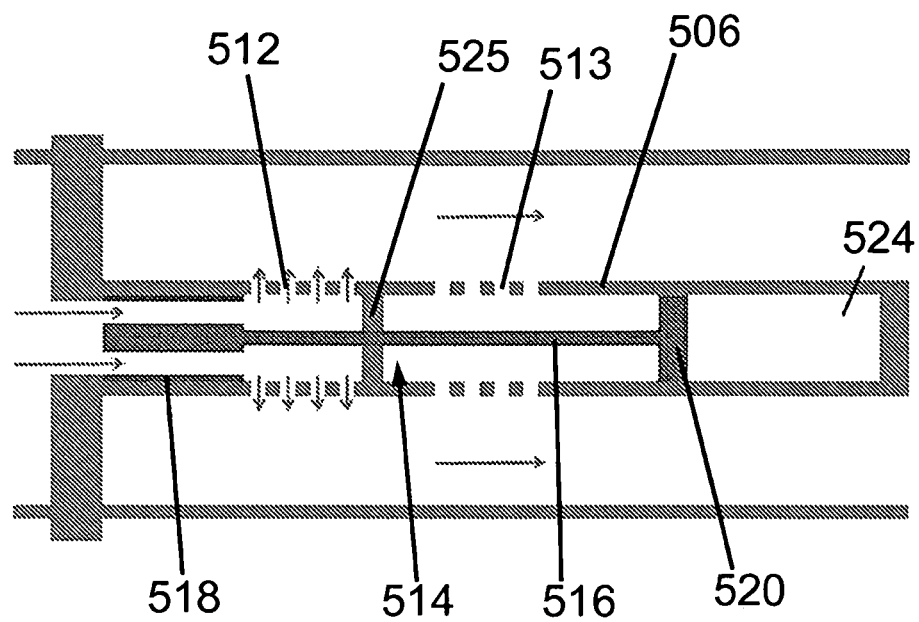
Figure 6B:
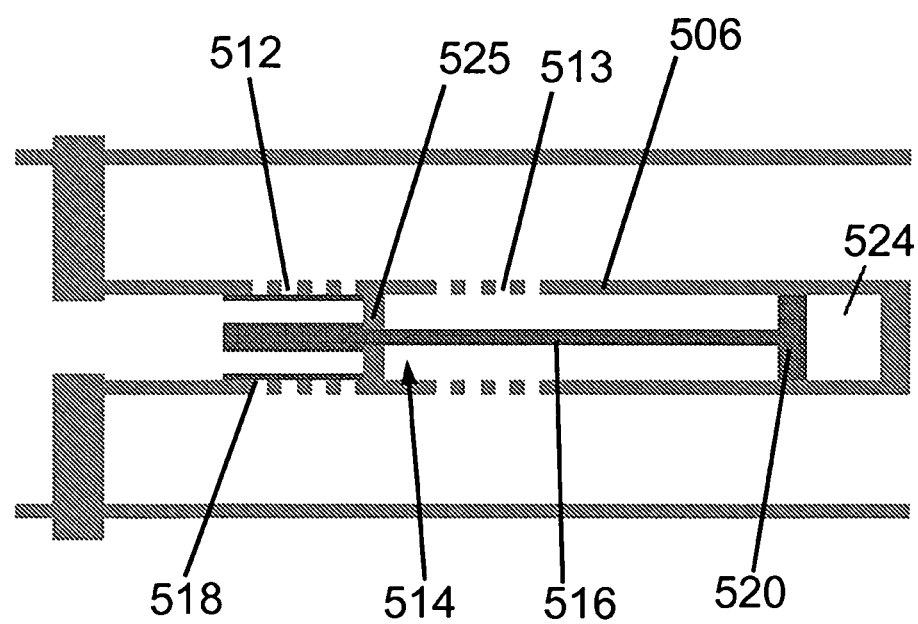

The schematic cross-sectional view of the device shown in FIGS. 6a and 6b shows a similar device to that shown in FIGS. 5a and 5b. The housing 506 comprises a wall 525 through which the shaft 516 of the valve member 514 passes, but the plenum chamber 524 is provided at the distal downstream end of the housing 506. As a result, the valve member 514 is moved upstream when the reference pressure is greater than the downstream pressure, and the outlet apertures 512 are provided on the housing 506 downstream of the piston 518 of the valve member 514 when the valve member 514 is in its biased position. In order that the valve member 514 is influenced by the downstream pressure, the housing comprises a further set of apertures 513 downstream of the wall 525 and upstream of the plug 520.

The device shown in FIGS. 6a and 6b operates in a similar way to the devices shown in the previous Figures, i.e. a pressure differential between the downstream pressure and the reference pressure acts to move the valve member 514 to open or close the outlet apertures 512 in order to control the downstream pressure.

Figure 7A:
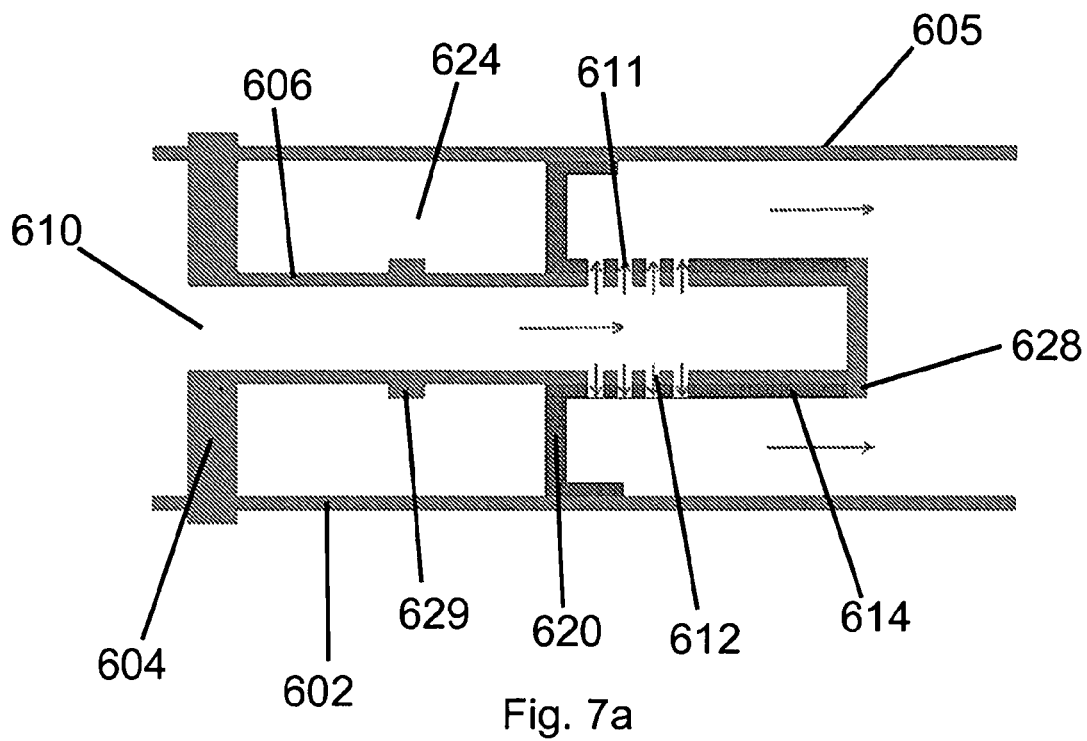
Figure 7B:
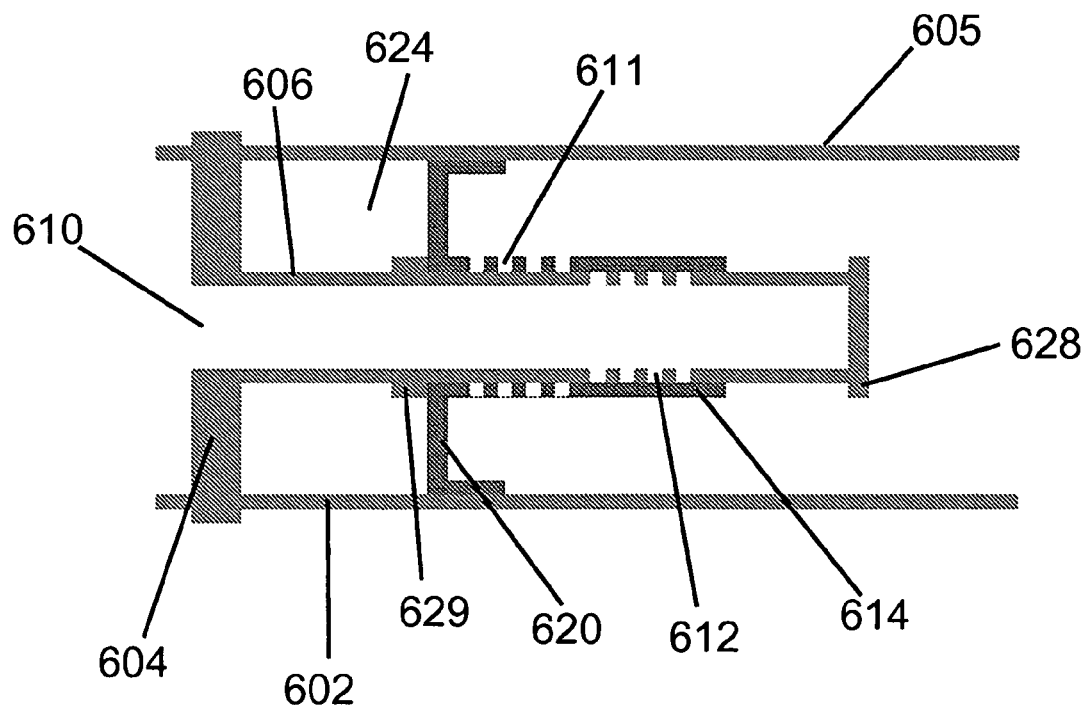

The schematic cross-sectional view of the device shown in FIGS. 7a and 7b shows a further embodiment of the device in accordance with the invention. The housing 606 of the device is similar to the housings in FIGS. 5a, 5b, 6a and 6b in that it is provided downstream of the flange 604 which mounts the housing 606 to the pipe 602, and the housing comprises an open inlet aperture 610 and a set of outlet apertures 612 which are controlled by the valve member 614. However the device shown in FIGS. 7a and 7b differs in that the valve member 614 is provided on the outside of the housing 606, e.g. as a sheath.

As well as the valve member 614, the plenum chamber 624 is also provided on the outside of the housing 606, in an annular volume defined between the outside of the housing 606, the downstream side of the flange 604 and the inner wall of the downstream section 605 of the pipe 602. The valve member 614 comprises an annular plug 620 which extends between the outside of the housing 606 and the inner wall of the downstream section 605 of the pipe 602, and which is acted on by the reference pressure to bias the valve member 614 downstream. An outwardly projecting cap 628 at the downstream distal end of the housing 606 retains the valve member 614 on the outside of the housing 606. A further outwardly projecting flange 629 upstream of the valve member 614 defines the minimum volume of the plenum chamber 624, i.e. as shown in FIG. 7b. In other embodiments the minimum volume could be very low or even zero.

The sheath of the valve member 614 comprises a set of apertures 611 to correspond with the outlet apertures 612 of the housing. When the valve member 614 is moved into its most downstream position (as shown in FIG. 7a) when the reference pressure is greater than the downstream pressure, the apertures 611 in the valve member 614 match up with the outlet apertures 612 in the housing and define a fluid flow path therethrough. When the valve member 614 is moved into its most upstream position (shown in FIG. 7b) when the downstream pressure is greater than the reference pressure, the portion of the sheath of the valve member 614 which does not possess apertures covers the outlet apertures 614 preventing any fluid flow through the device.

The device shown in FIGS. 7a and 7b operates in a similar way to the devices shown in the previous Figures, i.e. a pressure differential between the downstream pressure and the reference pressure acts to move the valve member 614 to open or close the outlet apertures 612 in order to control the downstream pressure.

FIGS. 8a, 8b, 8c and 8d show four different schematic examples of how the flange 704, onto which the housing 706 is mounted, can be mounted inside the pipe 702.

FIG. 8a shows an example of how the flange 704 can be mounted at a flanged connection 740 between the upstream section 703 and the downstream section 705 of the pipe 702. The flange 704 could be bolted between the flanged connection 740 in a similar manner to how the flanged connection 740 would normally be secured.

FIG. 8b shows an example of how the flange 704 can be mounted within a pipe 702, which may or may not be near a connection 740 in the pipe, though as will be appreciated the former makes the installation of the device simpler. In this example the flange 704 is welded to the inner surface of the pipe 702, by means of a welded connection 742. The flange 704 is shown welded to the downstream section 705 of the pipe 702, but it could in other embodiments be welded to the upstream section 703.

FIG. 8c shows an example of how the flange 704 can be mounted at a flanged connection 746 between the upstream section 703 and the downstream section 705 of the pipe 702, similar to the example shown in FIG. 8a. In this example, there is a recess 744 formed in the flanged connection 746 which accommodates the flange 704. The two sides of the flanged connection 746 are therefore attached directly to each other, thus holding the flange 704 in place.

FIG. 8d shows an example of how the flange 704 can be mounted using rolled groove Victaulic connectors 748. The flange 704 of the device is placed between the upstream section 703 and the downstream section 705 of the pipe 702, similar to the example shown in FIG. 8a, but instead of bolting the flange 704 to the sections of the pipe 702, the flange 704 is held in place by the Victaulic connectors 748.

All of the examples shown in FIGS. 8a, 8b, 8c and 8d of how the flange 704 may be mounted to the pipe 702 are applicable to all of the embodiments shown in the previous Figures.

FIGS. 9a, 9b and 9c show examples of experimental results obtained using an embodiment in accordance with the invention. Each plot displays pressure against time, with the input, reference and output pressures being measured for a period of 60 seconds. For each of the experiments performed, a reference pressure 850, 860, 870 was set, the input pressure 852, 862, 872 was varied across a range of pressures both below and above the reference pressure 850, 860, 870, and the resultant output pressure 854, 864, 874 was measured.

The plot in FIG. 9a shows that the reference pressure 850 was set at about 11 bar and the input pressure 852 was varied in an approximate square wave between about 1 bar and about 24 bar with a period of about 8 seconds. The plot in FIG. 9b shows that the reference pressure 860 was set at about 11 bar and the input pressure 862 was increased rapidly from about 1 bar to about 24 bar, maintained at an approximately constant level for about 15 seconds, and then gradually reduced over the remaining time. The plot in FIG. 9c shows that the reference pressure 870 was set at about 19 bar and the input pressure 872 was varied in an approximate square wave between about 1 bar and about 21-23 bar with a varying time period.

All of the experimental results, displayed in FIGS. 9a, 9b and 9c show that when the input pressure 852, 862, 872 is less than the reference pressure 850, 860, 870, the output pressure 854, 864, 874 is equal to the input pressure 852, 862, 872. When the input pressure 852, 862, 872 is greater than the reference pressure 850, 860, 870, the output pressure 854, 864, 874 has a value which is slightly less than, but well matched to, the reference pressure 850, 860, 870. This demonstrates that a device in accordance with the invention can be effectively used to control the output pressure to match the reference pressure (whenever the input pressure exceeds the reference pressure) for a fluctuating input pressure.

It will be appreciated by those skilled in the art that many variations and modifications to the embodiments described above may be made within the scope of the various aspects of the invention set out herein. For example, different arrangements of the housing and the valve member could be envisaged, for example with the valve member passing from the inside to the outside of housing. Furthermore, the valve member need not act only one set of inlet or outlet apertures, it could act on both of these.

The invention claimed is:

1. A device for controlling a flow of a fluid through a conduit from an upstream side to a downstream side, the device comprising:
    a flange arranged for attaching the device to the conduit, wherein the flange defines a flange aperture that is substantially coaxial with a central axis of an upstream section of the conduit and with a central axis of a downstream section of the conduit;
    a housing provided as a separate structure within the conduit, wherein the housing extends from or through the flange aperture;
    a valve having a valve member arranged to move reciprocally to selectively open and close at least one valve aperture defined in an outer wall of the housing, thereby controlling flow of the fluid from the upstream side to the downstream side, wherein the downstream side has a downstream pressure; and
    an arrangement for introducing a reference pressure to act on the valve member;
    wherein said valve member is acted on by the downstream pressure and the reference pressure so as to be moved by a difference between said pressures.

2. A device as claimed in claim 1, wherein the movement of the valve member balances the downstream pressure with the reference pressure.

3. A device as claimed in claim 1, wherein the movement of the valve member depends only on the difference in the downstream and reference pressures.

4. A device as claimed in claim 1, wherein the valve member is moved towards a position in which the at least one valve aperture is open when the reference pressure is greater than the downstream pressure and moved towards a position in which the at least one valve aperture is closed when the reference pressure is less than the downstream pressure.

5. A device as claimed in claim 1, wherein the device is arranged to deliver a constant output pressure for a varying input pressure.

6. A device as claimed in claim 1, comprising an arrangement to control the reference pressure.

7. A device as claimed in claim 1, wherein the conduit comprises a central axis, and the valve member is arranged to move in a direction parallel to the central axis of the conduit.

8. A device as claimed in claim 1, wherein the at least one valve aperture comprises a plurality of apertures through which the flow of fluid is controlled by the valve member.

9. A device as claimed in claim 1, wherein the valve member is movably mounted with respect to the housing.

10. A device as claimed in claim 1, wherein the housing comprises a cylinder.

11. A device as claimed in claim 10, wherein the valve member comprises the same cross-sectional shape as the cylinder.

12. A device as claimed in claim 1, wherein the valve member is arranged to be mounted coaxially on or in the housing.

13. A device as claimed in claim 1, wherein a part of the valve member which controls the flow of fluid through the at least one valve aperture is arranged to be pressure balanced within the housing.

14. A device as claimed in claim 1, wherein the housing is mounted coaxially within the conduit.

15. A device as claimed in claim 1, wherein the device is mounted so that the valve member moves in a direction parallel to a central axis of the conduit.

16. A device as claimed in claim 1, comprising a damper arranged to act on the valve member.

17. A device as claimed in claim 1, comprising a plenum chamber subject to the reference pressure.

18. A device as claimed in claim 1, wherein the reference pressure is set by a pilot pressure regulator.

19. At least one section of pipe comprising the device as recited in claim 1.

20. The device of claim 1, wherein the housing is suspended within the conduit, and the device comprises at least one of the following features: (i) at least a first portion of the housing extends into an interior of the upstream section, or (ii) at least a second portion of the housing extends into an interior of the downstream section.

21. The device of claim 1, wherein:
    the housing defines an inlet aperture in fluid communication with the upstream section of the conduit, and defines an outlet aperture in fluid communication with the downstream section of the conduit, wherein the at least one valve aperture defined in the outer wall of the housing comprises at least one of the inlet aperture or the outlet aperture;
    the inlet aperture is arranged upstream of the flange; and
    the outlet aperture is arranged downstream of the flange.

* * * * *